Nov. 20, 1945.   G. E. KING   2,389,368
CONTROL SYSTEM
Filed July 20, 1944

WITNESSES

INVENTOR
George E. King.
BY
Paul E. Friedemann
ATTORNEY

Patented Nov. 20, 1945

2,389,368

UNITED STATES PATENT OFFICE 2,389,368

CONTROL SYSTEM

George E. King, Swissvale, Pa., assignor to Westinghouse Electric Corporation, East Pittsburgh, Pa., a corporation of Pennsylvania Application July 20, 1944, Serial No. 545,754

11 Claims. (Cl. 172—239)

This invention relates, generally, to speed matching control systems and, more particularly, to systems of this type for controlling at selected constant values the ratio of the speeds of a pair of rotating elements.

The invention as hereinafter described is particularly adaptable for controlling the speed of operation of a motor driving the cutting tool of a boring mill. The invention, however, is of general application and is not necessarily limited to such use.

In general practice, large boring mills are provided with rotating tables upon which the part to be machined is clamped and a cutting tool is fed into the part being machined at some suitable speed to obtain the cut desired.

For such a mill to perform satisfactory machining operations, it is essential that the cutting tool be fed into the work at a constant rate of speed assuming a constant operating speed of the table. Since table speeds ordinarily vary, for example, with loadings of the cutting tool and for other reasons, a constant feed for the cutting tool is not always desirable. A more satisfactory arrangement is to provide a cutting tool which is fed into the part being machined at a speed such that the ratio of the speeds of the cutting tool and the table is a substantially constant value.

A principal object of this invention is to provide a control system for maintaining at a substantially constant value a preselected ratio of the operating speeds of a pair of elements.

Another object of this invention is to provide a control system of the character described in which the ratio of the operating speeds of a pair of elements may be selectively varied and the selected ratio maintained substantially constant.

Figure 1:
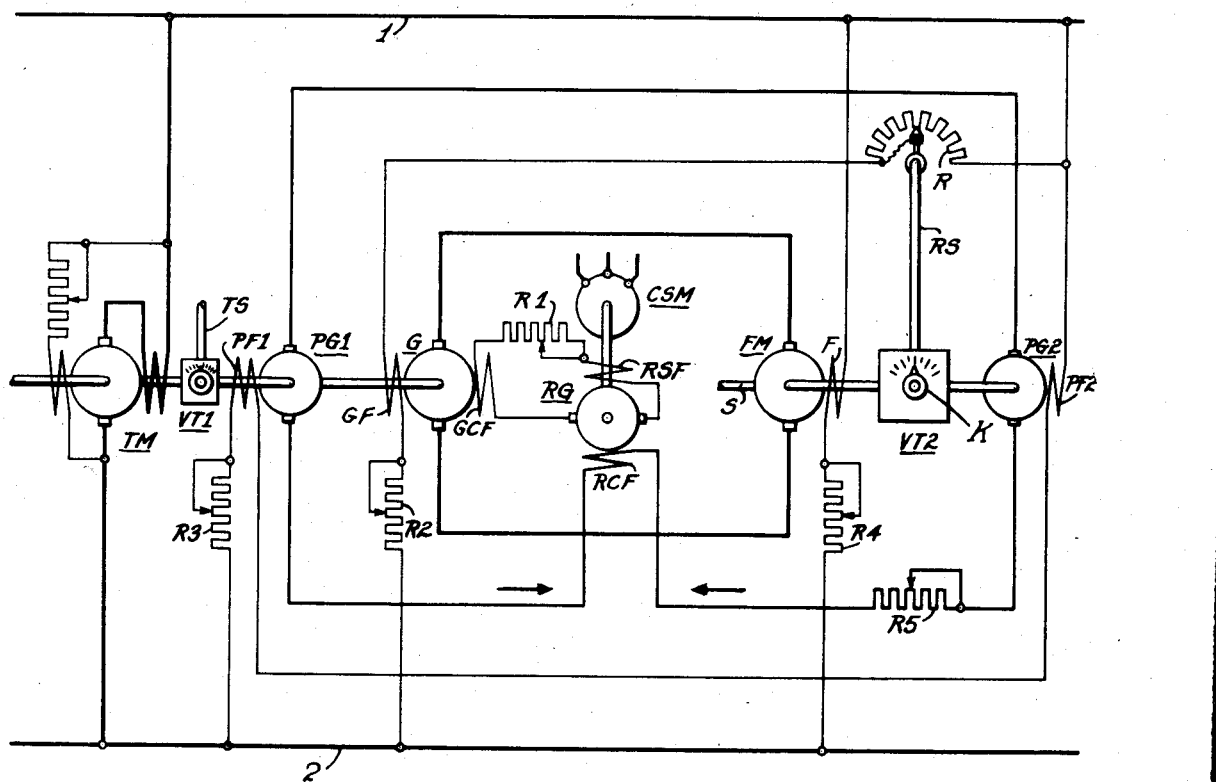

Other objects and advantages will become more apparent from a study of the following specification when considered in conjunction with the accompanying drawing, in which:

Figure 1 is a control system embodying the principles of this invention; and

Figure 2:
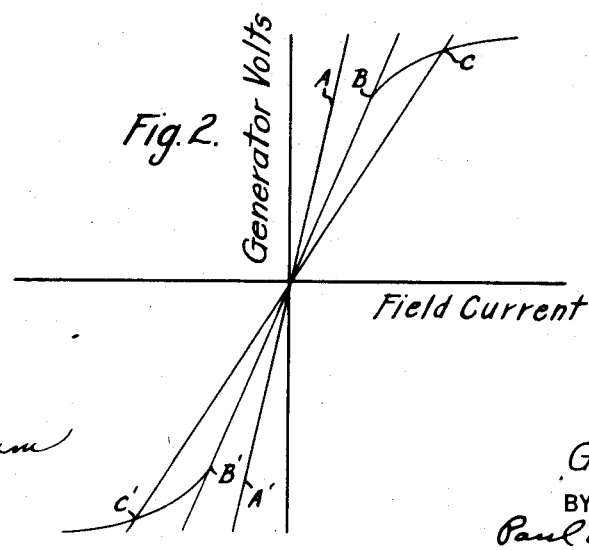

Fig. 2 graphically illustrates the operating characteristics of the regulating generator embodied in the control system of Fig. 1.

In a broad sense the control system of Fig. 1 controls the ratio of the speed of a reference element and an element to be controlled by producing electrical quantities proportional to the speeds of the elements, electrically opposing and thus comparing the quantities, and utilizing the differential of the electrical quantities to control the value of the electrical energy supply for the element to be controlled.

The reference element referred to is in Fig. 1 the boring mill table, not shown, or its shaft TS, or the boring mill table motor TM, depending upon the arrangement of the table drive. That is, if the motor TM is a constant speed motor a suitable variable ratio transmission, generally indicated at VT1, is provided; the output shaft TS of which is utilized to drive the boring mill table. Since the input speed to the variable ratio transmission is a substantially constant value, in order to vary the rotational speed of the boring mill table it is necessary that the ratio of the drive through the transmission VT1 be changed to change the table speed. Any suitable transmission may serve this purpose. On the other hand, if the table motor is operated at variable speeds by a suitable variable voltage system, the transmission ratio from the motor to the boring mill table may be a fixed value.

For the first named operating condition the pilot generator PG1 which produces the electrical quantity proportional to the speed of the reference element, must be driven either directly from the table through a suitable gear ratio transmission or may be driven through a transmission such as VT1 in which the ratio of the table driving shaft TS and the shaft connecting the pilot generator with this transmission is a fixed value.

In the second instance the pilot generator may be driven through any fixed ratio transmission either by the boring mill table or by the boring mill table motor. The element to be controlled is the cutting tool or its driving motor or both.

While the table or its motor is herein referred to as the reference element and the motor driving the cutting tool, or the cutting tool, or both, as the element to be controlled, such terms are merely illustrative and are employed merely to distinguish the elements. It should be understood and will be apparent from the drawing that either element, that is, the table or its motor or the cutting tool or its motor may be the reference element. That is, should the speed of the motor driving the tool decrease but no change in the table speed occur, then the table or its driving motor is the reference element. Should the table speed change without a change in the speed of the cutting tool or its motor, then these elements are the reference elements. In any case, the speed of the cutting tool is controlled by means of this control system.

The system of Fig. 1 comprises, generally, the table motor TM which drives the boring mill table and a feed motor FM which controls through the medium of shaft S the speed with which the cutting tool is fed into the part being machined. The table motor or the boring mill table, as the case may be, operates the pilot generator PG1 through the variable speed transmission VT1. The feed motor operates a pilot generator PG2 which is preferably identical with the first mentioned pilot generator, through the medium of the variable speed transmission VT2. A main generator G which may be termed the feed generator is shown connected to a shaft which is common with the pilot generator PG1 and hence is also driven at a speed proportional to the speed of the boring mill table. A regulating generator RG is driven at a constant speed by any suitable means, for example, a separate constant speed motor such as the motor CSM, the table motor TM if this motor is a constant speed motor, or by a motor (not shown) of a variable voltage control system for a motor such as TM should this motor be a variable speed motor.

The pilot generators PG1 and PG2 are, respectively, provided with the field windings PF1 and PF2. These field windings are connected in series circuit relationship with each other and with a resistor R3 across a direct-current source indicated generally by the conductors 1 and 2.

The main generator or feed generator G is provided with a main field GF which is connected in series with a variable rheostat R and a resistor R2 across the supply conductors 1 and 2.

The field winding F of the feed motor is connected in series with a resistor R4 across the supply conductors 1 and 2. The regulating generator RG is provided with a series field winding RSF connected in series with an adjustable resistor R1 and connected across the control field winding GCF of the main generator. The control field winding RCF for the regulating generator is connected in series in a circuit connecting the armatures of the pilot generators in electrical opposition. The resistors R3, R2, R4 and R5, respectively, in the field circuits of the pilot generator, the feed generator, the feed motor, and the regulating generator are provided for the purpose of adjusting the sensitivity of these field circuits.

The rheostat R provided in the field circuit of the generator field GF is for the purpose of varying the excitation of this generator to vary the electrical output thereof supplied to the feed motor. The resistance of this rheostat is varied upon adjustment of the knob K which changes the transmission ratio of the variable ratio transmission VT2 and at the same time operates the rheostat shaft RS to produce a change in the excitation of the field winding GF simultaneously with a change in the ratio of the drive from the feed motor to the pilot generator PG2. The arrangement is such that operation of the knob K to shunt the rheostat R also increases the ratio of the input to output speeds of the transmission VT2.

The variable ratio transmissions VT1 and VT2 are not disclosed in detail since any suitable transmissions having the characteristics hereinafter disclosed may be used. Further, the invention lies not in these transmissions but in the combination of the elements comprising the system.

Before proceeding with a discussion of the operation of the system, a description of the characteristics of the regulating generator RG will facilitate the understanding of the invention.

The saturation curve of a series generator is drawn in Fig. 2. Stable operation of a direct-current generator is possible only if the resistance of the field circuit is less than that of the line tangent to the initial straight line portion of the no-load saturation curve of the machine. If the slope of the resistance is higher the generator voltage cannot build up. The slope of such a resistance line is indicated by the line AA'. If the slope of the resistance line is less than the initial straight line portion of the saturation curve, the generator open circuit voltage will be that determined by the intersection of the line with the saturation curve, for example, the intersecting points C and C'. If the resistance just equals the slope of the initial straight line portion of the curve, the generator can theoretically have an open circuit voltage equal to the ordinate of any of the points of tangency. For example, the points of tangency B and B'.

The resistor R1 is provided in the field circuit of the regulating generator for the purpose of establishing the correct slope of the resistance line to thus make the machine substantially self-energizing. Since the regulating generator excites only the control field winding of the main generator, its normal steady output need only be sufficient to correct for residual and IR drop effects of the main generator G and the motor. As a result the regulating generator supplies substantially only the corrective current necessary to maintain the selected ratios of the speeds of the table and the cutting tool.

While such an operating condition would be undesirable in a standard generator, for example, the generator G, it is an ideal characteristic for the regulating generator. The purpose of the control field winding then becomes only that of locating the proper operating point of the series generator RG along the tangent curves and supplying the small amount of power required by the generator field.

The operation of the system is as follows: Assume the table is operating at some predetermined speed and that the cutting tool is being fed into the work at a preselected speed determined by the setting of the rheostat R. The output of the feed generator G under these conditions is roughly proportional to the speed of the table. Thus the feed motor operates to move the cutting tool into the part being machined at the preselected cutting speed. For a condition of equilibrium the output of the pilot generator PG1 and the output of the pilot generator PG2 are equal in value, thus their voltages which are opposed in the field winding RCF produce no flux. Such a point in the operating cycle at which the voltages of the pilot generators PG1 and PG2 are equal and opposed is represented by the equal length arrows adjacent the loop circuit connecting the armatures of the pilot generators. This indicates that the feed motor is operating at its correct speed. If, however, one or the other of the pilot generators drops in speed due to a change in speed either of the table or of the cutting tool, a differential voltage appears across the control field winding RCF, and the output of the regulating generator excites the field winding GCF in such a direction to correct the output of the main generator G to produce the proper operating speed of the motor F. If it is desired to change the rate at which the cutting tool is fed into the work, it is only necessary to adjust the knob K so that the pointer may move along the dial, which is preferably calibrated in inches feed per revolution of the table, to the new operating point. This operates the rheostat shaft RS which is mechanically connected to the knob K and automatically changes the excitation of the field winding GF to produce the correct generator voltage and simultaneously therewith changes the ratio of the transmission in a manner to prevent a change in the speed of the pilot generator as a result of a change in the speed of the feed motor for the newly selected cutting speed.

The operation of the system may probably be better understood by assigning specific values of speed for the various elements. If the transmission VT2 is variable over a 50:1 ratio, if the pilot generator PG1 operates at a speed 240 times greater than that of the table, and further assuming that the table operates over a speed range of 1/6 R. P. M. to 5 R. P. M. and that the feeding range of speeds of the cutting tool is 1/100 of an inch to 1/2 an inch per revolution of the table, and assuming that the speed of the feed motor must be 1 R. P. M. to feed 1/100 of an inch per revolution of the table when the table is running at 1/6 R. P. M., then the feed motor must operate at 50 R. P. M. for 1/2 inch cutting tool feed per revolution of the table. When the table is operating at 5 R. P. M., the feed motor must operate from 30 R. P. M. to 1500 R. P. M. for a 1/100 of an inch to 1/2 inch cutting tool feed per revolution of the table. The pilot generator PG1 operates over a 30:1 speed range. The feed motor operates over a 1500:1 speed range. The pilot generators, if they are electrically identical, must run at the same speed in order to have their output voltages match.

On the basis of the foregoing, if the table is assumed to be operating at 1/6 R. P. M., then the pilot generator PG1 is operated at 40 R. P. M. If a cut of 1/100 of an inch per revolution of the table motor is desired, the variable speed transmission VT2 and the rheostat R are adjusted to give this speed. At this speed the feed motor will operate at 1 R. P. M. and the pilot generator PG2 at 40 R. P. M. To change the cut to 1/2 inch per revolution of the boring mill table, the adjusting knob K is operated in a direction to shunt resistance from the field circuit of the generator G and at the same time the knob adjusts the variable ratio transmission to the opposite extreme thereby maintaining the speed of the pilot generator PG2 at its selected speed of 40 R. P. M. for the higher value of speed of the feed motor.

The speed of the table may be increased by adjustment of the transmission VT1. This automatically increases the speeds of the pilot generator PG1 and the main generator G. The increased electrical output of the main generator G as a result of its increased speed increases the speed of the feed motor to maintain the selected ratio of speeds of the table and the feed motor. Thus the speed of the pilot generator PG2 again matches that of the pilot generator PG1 and the voltage across the control field winding RCF is zero.

As will be seen from Fig. 2, small values of exciting currents in the field winding RCF produce substantial output voltages of the regulating generator RG. Thus a corrective stimulus of a fairly large value for a small departure in speed ratio of the elements being controlled is applied to the control field winding GCF. As a result, departure in selected ratios of speeds are quickly corrected. Similarly, once a condition of equilibrium is approached, the corrective stimulus is rapidly removed. Hence the system is largely free of any tendency to hunt.

The system disclosed in addition to providing inherently accurate matching of the speeds of the reference element and the controlled element is relatively simple in its design. Furthermore, by providing a system in which only rotating equipment is utilized such a system may operate over long periods of time with but little maintenance effort.

The foregoing disclosure and the showings made in the drawing are merely illustrative of the principles of this invention and are not to be considered in a limiting sense. The only limitations are to be determined from the scope of the appended claims.

I claim as my invention:

1. In combination, a driving element, means for producing a first electrical quantity proportional to the speed of operation of said element, means for producing a second electrical quantity proportional to the speed of operation of said element, a driven element responsive to said second mentioned electrical quantity, means for producing a third electrical quantity proportional to the speed of operation of said driven element, circuit means for connecting said means for producing said first and third electrical quantities in electrical opposition and producing an electrical quantity which is the differential of said first and third electrical quantities and means responsive to the differential of the first and third electrical quantities for controlling said means for producing said second electrical quantity.

2. In combination, a driving element, means for producing a first electrical quantity proportional to the speed of operation of said element, means for producing a second electrical quantity proportional to the speed of operation of said element, a driven element responsive to said second electrical quantity, means for producing a third electrical quantity proportional to the speed of operation of said driven element, circuit means for connecting said means for producing said first and third electrical quantities in electrical opposition and producing an electrical quantity which is the differential of the first and third electrical quantities, means responsive to the differential of the first and third electrical quantities for controlling said means for producing said second electrical quantity and means for simultaneously changing the value of the second electrical quantity to change the speed of said driven element and preventing a change in said means for producing said third electrical quantity as a result of said change in speed of said driven element.

3. In combination, a driving element, a first generator including a field winding and driven at a speed proportional to the speed of said element, a second generator having at least one field winding and driven at a speed proportional to the speed of said element, a motor electrically connected to said second generator to be energized thereby, a third generator having a field winding and driven at a speed proportional to the speed of said motor, a fourth generator having a field winding, means for driving the fourth generator at a constant speed, a source of electrical energy, circuit means connecting the field windings of the first and third generators in series circuit relation with the source of electrical energy, circuit means including the field winding of the fourth generator connecting the electrical outputs of the first and third generators in electrical opposition, circuit means connecting a field winding of the second generator with the fourth generator to be energized by the electrical output of the fourth generator.

4. In combination, a driving element, a first generator having a field winding, and driven at a speed proportional to the speed of said element, a second generator having a plurality of field windings and driven at a speed proportional to the speed of said element, a motor, circuit means electrically connecting said second generator to said motor to energize said motor, a third generator having a field winding and driven at a speed proportional to the speed of said motor, a fourth generator having a field winding, means for driving the fourth generator at a constant speed, a source of electrical energy, circuit means connecting the field windings of the first and third generators with the source of electrical energy, circuit means including the field winding of the fourth generator, connecting the first and third generators in electrical opposition, circuit means connecting a field winding of the second generator with the fourth generator to energize the field winding with the electrical output of the fourth generator, circuit means including a variable resistance element connecting a second field winding of the second generator with the source of electrical energy, and means for simultaneously changing the resistance of the variable resistance element and the ratio of the speeds of the third generator and said motor.

5. In combination, a driving element, a first generator, a second generator, a third generator, a fourth generator, a motor, means mechanically connecting the first and second generators to said element to be driven thereby, means including a variable ratio transmission element mechanically connecting the third generator to said motor to drive the third generator at a speed proportional to the speed of said motor, means for driving the fourth generator at a constant speed, circuit means electrically connecting the second generator with said motor to energize said motor, means responsive to the differential of the electrical outputs of the first and third generators for controlling the fourth generator, means responsive to the electrical output of the fourth generator for controlling the second generator, means including a variable resistance element for additionally controlling the second generator, and means for simultaneously varying the transmission ratio of the variable ratio transmission element and the resistance of said variable resistance element.

6. The method of controlling the ratio of the speeds of a motor and a reference element which comprises the steps of, producing a first electrical quantity proportional to the speed of said element, producing a second electrical quantity proportional to the speed of said element, energizing said motor with said second electrical quantity, producing a third electrical quantity proportional to the speed of said motor, producing an electrical quantity which is the differential of the first and third electrical quantities and utilizing the differential electrical quantity to vary the magnitude of the second electrical quantity.

7. The method of controlling the ratio of the speeds of a motor and a reference element which comprises the steps of, producing a first electrical quantity proportional to the speed of said element, producing a second electrical quantity proportional to the speed of said element, energizing the motor with the second electrical quantity, producing a third electrical quantity proportional to the speed of said motor, producing an electrical quantity which is the differential of the first and third electrical quantities, amplifying the differential electrical quantity, and utilizing the amplified differential electrical quantity to vary the magnitude of the second electrical quantity.

8. The method of controlling the ratio of the speeds of a motor and a reference element which comprises the steps of, producing a first electrical quantity proportional to the speed of said element, producing a second electrical quantity proportional to the speed of said element, energizing the motor with the second electrical quantity, producing a third electrical quantity proportional to the speed of said motor, producing an electrical quantity which is the differential of the first and third electrical quantities utilizing the differential electrical quantity to control the second electrical quantity, varying the second electrical quantity independently of the speeds of the motor and the element to change the ratio of the speeds of the motor and the element, and maintaining the value of the third electrical quantity independent of the speed change of the motor due to the independent variation of the second electrical quantity.

9. The method of controlling the ratio of the speeds of a reference element and a motor which comprises the steps of, producing a first electrical quantity proportional to the speed of said element, producing a second electrical quantity proportional to the speed of said element, energizing the motor with the second electrical quantity, producing a third electrical quantity proportional to the speed of said motor, producing an electrical quantity which is the differential of the first and third electrical quantities, amplifying the differential electrical quantity, utilizing the amplified differential electrical quantity to control the second electrical quantity, varying the magnitude of the second electrical quantity independently of the speeds of the motor and the element to change the speed of the motor and thus the ratio of the speeds of the motor and the element, and maintaining the value of the third electrical quantity independent of the change in speed of the motor due to the independent variation of the second electrical quantity.

10. In combination, a driving element, a first generator driven by said element, a second generator driven by said element, a motor, circuit means electrically connecting the motor to the second generator to effect energization of said motor, a third generator driven by the motor, a fourth generator, means for driving said fourth generator at a constant speed, means responsive to the differential of the electrical outputs of the first and third generators for controlling the fourth generator, and means responsive to the electrical output of the fourth generator for controlling said second generator.

11. In combination, a driving element, a first generator driven by said element, a second generator driven by said element, a motor, circuit means for electrically connecting the second generator with said motor to energize said motor, a third generator driven by said motor, a fourth generator, means for driving the fourth generator at a constant speed, means responsive to the differential of the electrical outputs of the first and third generators for controlling the excitation of the fourth generator, means responsive to the electrical output of the fourth generator for controlling the excitation of the second generator, and separate means for simultaneously varying the excitation of the second generator to vary the speed of said motor and preventing a change in speed of the third generator as a result of the variation in speed of said motor.

GEORGE E. KING.